Nov. 19, 1963    G. W. BECK ETAL    3,110,938
SEALING STRIP

Filed Nov. 25, 1960    4 Sheets-Sheet 1

INVENTORS
GEORGE W. BECK
EDWARD P. HARRIS
MURRAY S. MILLHOUSE
CLETUS L. MOORMAN

BY
THEIR ATTORNEY

Nov. 19, 1963

G. W. BECK ETAL 3,110,938

SEALING STRIP

Filed Nov. 25, 1960

INVENTORS
GEORGE W. BECK
EDWARD P. HARRIS
MURRAY S. MILLHOUSE
CLETUS L. MOORMAN

BY
THEIR ATTORNEY

INVENTORS
GEORGE W. BECK
EDWARD P. HARRIS
MURRAY S. MILLHOUSE
CLETUS L. MOORMAN

By John T. Mann
THEIR ATTORNEY

INVENTORS
GEORGE W. BECK
EDWARD P. HARRIS
MURRAY S. MILLHOUSE
CLETUS L. MOORMAN
By John T. Marvin
THEIR ATTORNEY

United States Patent Office 3,110,938
Patented Nov. 19, 1963

3,110,938
SEALING STRIP
George W. Beck, Edward P. Harris, and Murray S. Millhouse, Dayton, and Cletus L. Moorman, Trotwood, Ohio, assignors to General Motors Corporation, Detroit, Mich., a corporation of Delaware
Filed Nov. 25, 1960, Ser. No. 71,463
3 Claims. (Cl. 20—69)

This invention relates to sealing strips and is particularly concerned with elastomeric sealing strips used in connection with automotive vehicles and the like.

An object of the invention is to provide a sealing strip including a spongy, resilient lip portion coextensively bonded to a tubular elastomeric portion which acts as a water barrier between the sponge material and the structural face to which the seal is to be applied.

In carrying out the above object it is a further object, in some cases, to utilize a second spongy portion at the opposite side of the mechanical rubber portion for aiding in sealing the strip to the structure to which it is applied.

A still further object of the invention is to provide a sealing strip including a spongy resilient elastomeric lip portion coextensively bonded to a more dense tubular elastomeric portion which acts as a water barrier between the spongy material and the structural face to which the seal is to be applied.

In carrying out the above object it is a further object, in some cases, to utilize closed cell sponge material for the tubular portion.

A still further object of the invention is to partially embed the tubular portion in the spongy material which forms the lip portion of the sealing strip.

Another object of the invention is to form two tubular portions by extrusion in integral dual relation whereby after the strip is cured it may be slit longitudinally thereof to provide two tubular portions each of which includes a rough face thereon to enhance the bonding of the tubular portion to the remainder of the strip.

Further objects and advantages of the present invention will be apparent from the following description, reference being had to the accompanying drawings wherein preferred embodiments of the present invention are clearly shown.

Sealing strips for use around the doors of automotive vehicles are generally formed from latex foam material because of the softness and conformity of the foam and the relatively low cost thereof. This material has a tendency to absorb water due to the spongy partially open celled character thereof. Since these strips are held to the door by wire loops passing through apertures in the door as shown in Patent 2,579,072 there is a tendency when the vehicle is subjected to rain for the rain water to seep out of the interior of the door and onto the strip. The strip absorbs the same and during freezing weather, for example, this absorbed water freezes and often destroys the utility of the strip, furthermore, water in the strip on the door tends to ooze onto the upholstery of the automotive vehicle.

Various expedients have been used to prevent this water from oozing outwardly of the door onto the strip and upholstery, for example, plastic sealing devices as shown in copending applications S.N. 750,321, now abandoned and 853,190, now Patent No. 3,020,606, issued February 13, 1962 have been used for this purpose.

Figure 1:
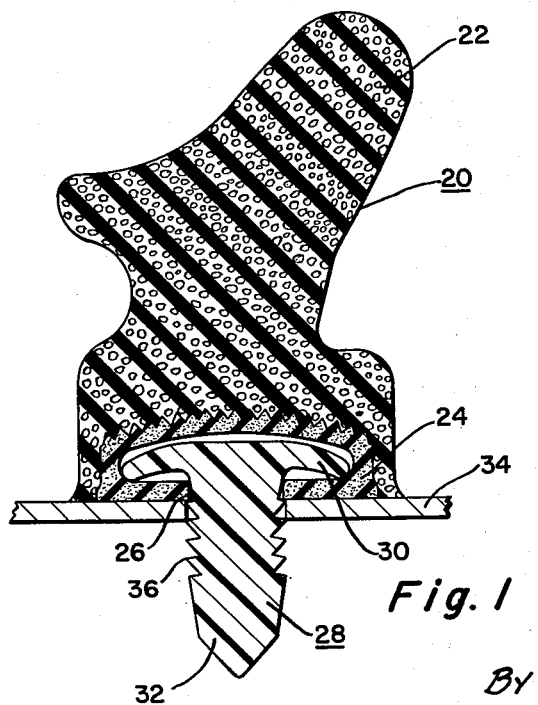
FIG. 1 shows a cross sectional view of a preferred form of sealing strip as described and claimed in the present invention wherein a section is taken through one of the fastening means with a strip attached to a sheet metal support.
Figure 11:
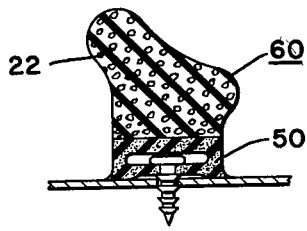
FIG. 11 is a view in cross section of the section shown in FIG. 5 applied to a panel showing a fastener means.
Figure 19:
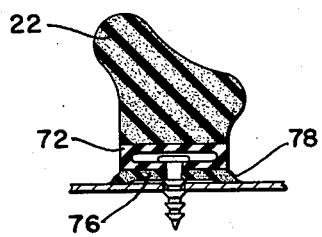
FIG. 19 shows a strip shown in FIGS. 12 and 13 in applied position with respect to a panel.
Figure 18:
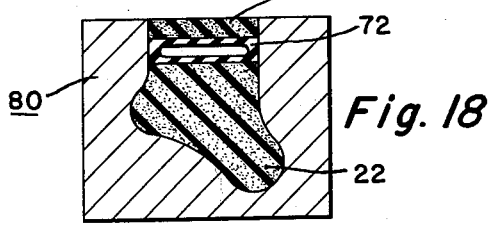
FIG. 18 shows the mold including latex foam, a mechanical tubular rubber portion and an overlying closed cell sponge portion of the precured sponge material

In order to eliminate the necessity for utilizing separate sealing means at each attachment point as shown in the aforementioned applications, the present invention utilizes a coextensive barrier extending longitudinally of the strip and made from rubber-like material either solid or of closed cell structure. Various expedients may be used to accomplish this end. Cross sections of variations of the instant strip are shown in FIGS. 1, 11 and 19 as applied to a panel. In each instance the sealing lip portion of the strip is made from latex foam and in each instance the fastener retaining portion thereof is a more dense elastomeric material carried by the sealing lip portion thereof. In this manner the more dense material acts as a barrier since the fasteners only pass through one wall thereof and water contained within the door cannot be taken up by the spongy section of the portion of the strip.

Referring specifically to FIG. 1 in the drawings, a strip is shown at 20 which includes a sealing lip portion 22 and a more dense tubular elastomeric portion 24. The tubular portion 24 in this instance is made from closed cell neoprene sponge although it is apparent that this may be made of any closed cell material or the portion may be made from mechanical rubber, the improvement factor being that the tubular insert is more dense than the remainder of the sealing strip and is of such a character that it will not permit passage of water therethrough. It will be noted that the tubular portion 24 is actually partially imbedded in the foam rubber sealing lip portion and is perforated at spaced intervals as at 26 so that fastening means 28 may be inserted therein wherein the head portions 30 are retained within the tubular member 24 and wherein the shank portions 32 thereof extend outwardly of the tubular member 24 through apertures punched or drilled therein and are capable of engaging a panel member 34 for releasably engaging the strip to the panel member.

It will be noted that the specific formation of the fasteners 28 is of importance in that the head portions 30 thereof are formed so that the outer edges of the strip are pressed firmly against the said sheet metal 34. Also, because of the concentric rings 36 on the shank portion 32 of the fastener 28 it is possible to force the fastener through the apertures in the said metal portion so that very tight engagement is obtained and wherein the concentric rings 26 prevent the fastener from reverse movement without considerable force being applied. In this connection, the fasteners 28 may be spaced at any convenient distance from one another as determined by the specific application. Furthermore, since there is no restriction within the strip 20 it is possible to stretch the strip to obtain proper alignment of the fasteners with the apertures on the supporting member if any small deviations occur. The fasteners may be made from any suitable deformable plastic material such as nylon, Delrin, etc.

Figure 2:
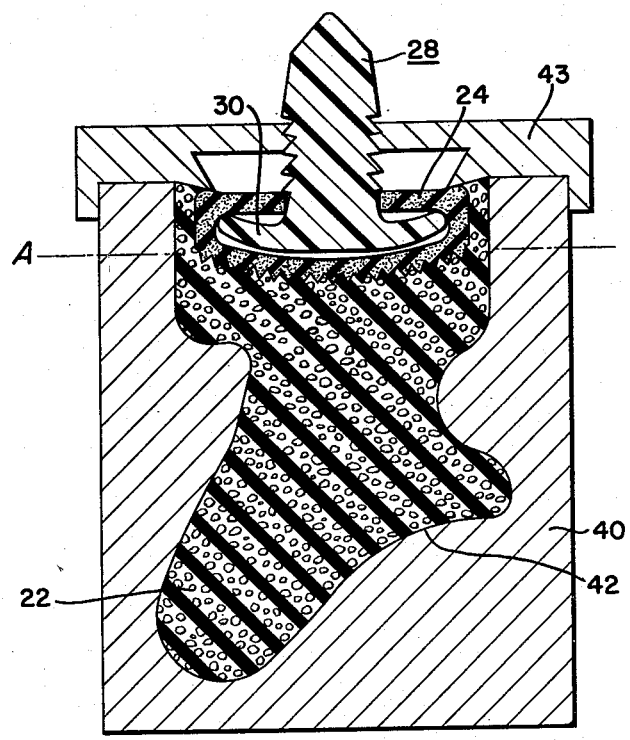
FIG. 2 is a view through a mold showing one method of supporting the strip during the molding thereof.

In the manufacture of the strip, indeterminate lengths of aluminum mold material 40 may be used which include a longitudinal mold cavity 42 therein. The mold cavity is progressively filled with latex foam to a point indicated by a dot dash line marked "A" in FIG. 2. Thereafter, the extruded tubular portion made from either solid elastomer, closed cell elastomer such as closed cell neoprene and the like, may be positioned in the mold. This action causes the foam to seep upwardly along the sides of the tubular portion 24 whereby the tubular portion 24 becomes partially imbedded in the foam. Tubular portion 24 may be carried by its fasteners which are attached to a cover member 43 for the mold. The mold with the foam in place is then passed through an oven to cause gelation of the foam which is thereafter fully cured and bonded to the tubular portion.

Figure 3:
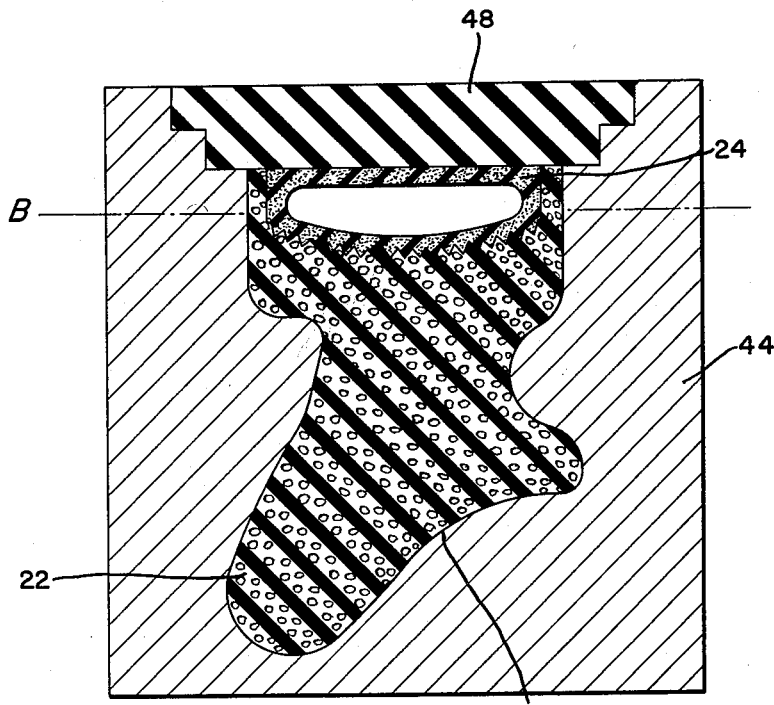
FIG. 3 is a section through a mold and strip similar to that in FIG. 2 showing another method of forming a strip.
Figure 4:
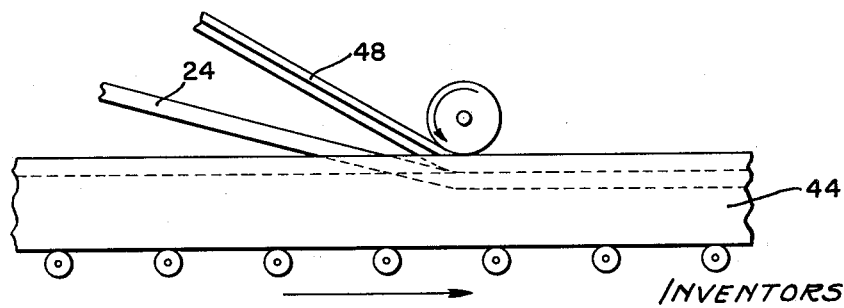
FIG. 4 is a fragmentary, diagrammatic view of a mold used in a continuous formation of sealing strips showing the progressive closing of the mold and a simultaneous placement of the tubular insert therein.

Another means for forming the specific strip shown in FIG. 1 is noted in FIG. 3 wherein a mold 44 is used having a cavity 46 therein which is filled to the line "B" with latex foam. Thereafter the tubular elastomeric portion 24 is progressively fed to the mold as shown in FIG. 4 and is pressed into the latex foam within the mold by a continuous rubber cork 48. This cork 48 holds the tubular portion in position during gelation of the foam and thereafter is removed from the mold progressively so that sealing strip may be taken therefrom and fully cured. This is similar to procedures disclosed in Patents 2,668,987 and 2,931,063, both assigned to the assignee of this invention.

In both instances the more dense elastomeric tubular portion is preferably fully cured before it is pressed in the mold, however, it is understood that this is not necessarily a limiting factor since it is apparent that the tubular elastomeric portion may be only partially cured wherein the full cure is accomplished during the cure of the sponge. Either expedient may be used and comes fully within the scope of the present invention.

Figure 5:
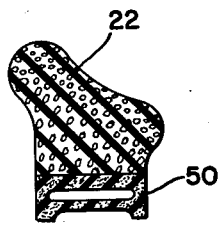
FIG. 5 is a view in section of another type of sealing strip.
Figure 6:
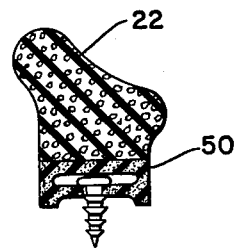
FIG. 6 is a view similar to FIG. 5 showing a fastener in place on the strip shown in FIG. 5.
Figure 8:
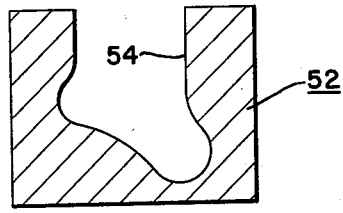
FIG. 8 is a cross section of a mold which may be used to form a strip shown in FIG. 5.
Figure 9:
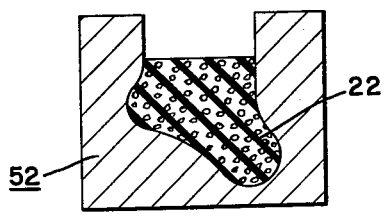
FIG. 9 shows the mold in FIG. 8 partially filled with latex foam to form the lip portion.
Figure 10:
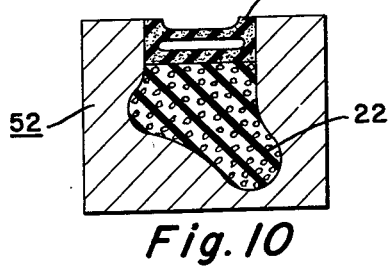
FIG. 10 shows the filled mold of FIG. 9 with the tubular portion inserted therein to close the mold whereby the tubular portion and the lip portion become bonded during curing.
Figure 12:
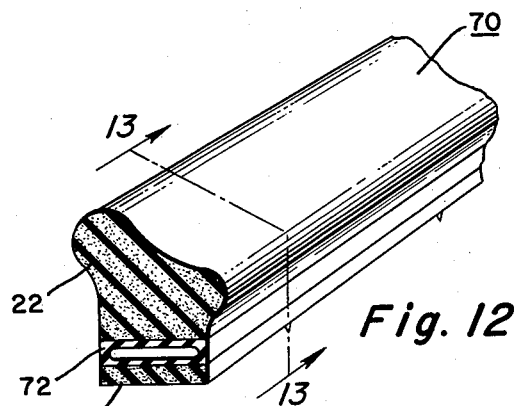
FIG. 12 is a view in cross section of another type strip utilizing a solid rubber tubular portion.

The same end may be accomplished by using the closed cell sponge tubular portion as the cork per se and this structure is shown in FIGS. 5 and 6. In this instance tubular portion 50 is applied to the sponge lip portion 22. The tubular portion 50 is preferably made from closed cell sponge material. In FIGS. 8 through 10 a diagrammatic description of the method is shown wherein the mold 52 of indeterminate length and preferably of aluminum, is used having a longitudinally extending cavity 54 therein. Latex foam is poured into the cavity to partially fill the same as shown in FIG. 9 and thereafter a preformed and preferably precured closed cell sponge member 50 is pressed into the mold to close the same during the gelation of the foam. A finished strip 60 is shown in FIG. 11 applied to a panel with the fastener heretofore described.

Figure 7:
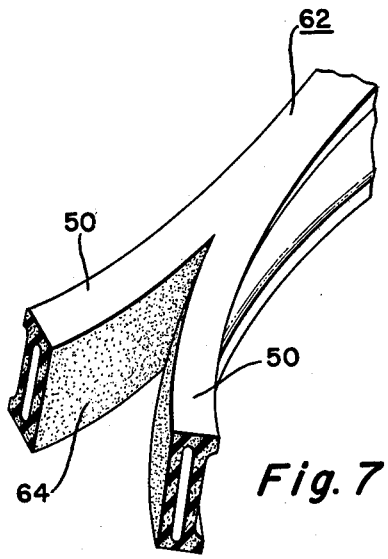
FIG. 7 is a view in perspective showing the tubular backing for the strip extruded in duplicate and partially cut apart to expose rough bonding surfaces.

When using this type of structure it is highly desirable to form the closed cell neoprene sponge portion 50 in duplicate as shown in FIG. 7 wherein a strip 62 thereof is extruded having identical opposed side portions and two cavities running therethrough. After curing, the strip 62 is slit or cut intermediate the sides thereof to form two strips 50 of identical configuration. The usefulness of this procedure is to form a closed cell strip wherein the bonding face 64 includes a rough surface as formed by the exposed cells. This roughened surface facilitates bonding to the latex foam.

Figure 14:
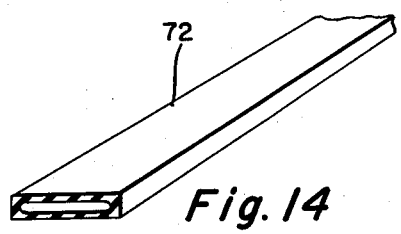
FIGS. 14 and 15 show two different types of mechanical rubber extrusions used for the tubular portion.
Figure 13:
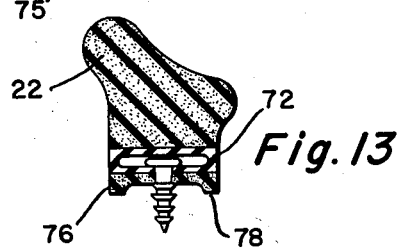
FIG. 13 is a sectional view of the strip shown in FIG. 12 with a fastener in place.
Figure 15:
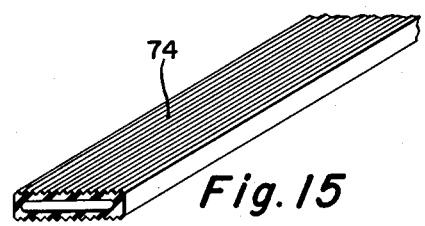
Figure 16:
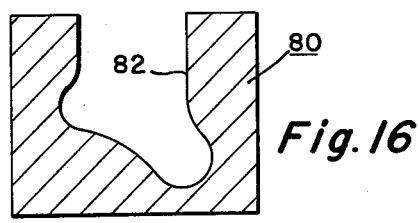
FIG. 16 is a cross section of a mold which may be used to form the strip shown in FIGS. 12 and 13.

FIGS. 12 through 19 show still another type of strip 70 wherein the foam rubber elastomeric lip portion 22 is the same as described in previous strips, the difference being in the application of the tubular barrier portion. In this instance the tubular barrier portion is shown at 72 and is preferably formed from extruded mechanical rubber although this may be closed cell sponge if desired. The tubular portion 72 may be extruded as shown in FIG. 14 or it may be extruded with a plurality of longitudinally extending ribs thereon as shown in 74 at FIG. 15 on opposite sides thereof. The purpose of the ribs is to increase the surface area whereby bonding is facilitated. In the strip shown at 70 a layer of closed cell neoprene sponge is utilized at 75 to enhance the sealing properties of the strip to the panel to which it is applied. This is carried out by extruding the closed cell sponge in either a flat ribbon as noted in or a conformed ribbon as shown at 76 in FIG. 13. In this instance two longitudinally extending ribs 78 are provided at opposite sides of the ribbon. These lips facilitate application of the strip as shown in FIG. 19.

Figure 17:
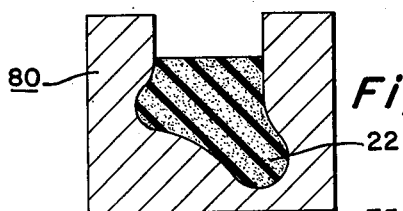
FIG. 17 shows the mold of FIG. 16 partially filled with latex to form the lip portion.

In either case the strip may be made by utilizing a longitudinally extending aluminum mold 80 which includes a cavity 82 therein. Cavity 82 is filled partially with latex foam as shown in FIG. 17 and thereafter the tubular strip 72 is positioned therein which strip includes the sponge face 75 preferably bonded thereto prior to application. In other words, the mechanical rubber tubular strip 72 may be assembled with the extruded sponge strip 74 and two parts may be cured together prior to application to the mold 80 although this is not mandatory since the assembly of the parts may be accomplished by usual bonding techniques during the gelation and curing of the foam.

In all the embodiments shown herein, therefore, it will be noted that the sealing lip portion of the strip is a foamed latex elastomer which is soft and readily conformable and forms an excellent seal. This foam material, however, is more or less open celled and is protection against absorption of water by the closed cell or mechanical rubber tubular portion which is positioned between the lip and the part being sealed.

In all cases, the entire assembly may include a complete cover film of neoprene cement or other suitable surface sealing layer to further protect the strip against water absorption and to make the strips more resilient to abrasion and the like. The cement may be fortified with graphite or other lubricant to reduce wear and eliminate noise. All of these expedients being well known in the art and forming no part of this invention.

While the embodiments of the present invention as herein disclosed, constitute preferred forms, it is to be understood that other forms might be adopted.

What is claimed is as follows:

1. A sealing strip for sealing two members and adapted to be releasably attached to one of said members, comprising in combination; an elongate body portion including an elongate flexible lip and formed from a spongy elastomeric material, an elongate more dense elastomeric portion spaced from said lip portion and coextensive with one face of said body portion and including a longitudinally extending cavity therein, a second elongate spongy resilient portion coextensively bonded to said more dense elastomeric portion and in opposed relation thereon with respect to said first mentioned elongate body portion whereby a longitudinally extending laminate is formed, and separate attachment means passing through said second mentioned spongy elastomeric portion and releasably associated with said more dense elastomeric portion at spaced distances therealong and adapted to attach said sealing strip to said other member.

2. A composite elongated sealing strip comprising, three longitudinally extending strata, the first of said strata consisting of a spongy elastomeric sealing member including a sealing lip extending therealong, the second of said strata consisting of an elongated more dense elastomeric tubular member bonded coextensively to said first strata and remote from said sealing lip, and a third strata consisting of a spongy elastomeric mounting member and bonded coextensively to said more dense elastomeric tubular member, said more dense tubular member thereby being interposed between and extending coextensively with said two spongy members.

3. The strip as claimed in claim 2 wherein the tubular intermediate member carries spaced attachment means which are releasably engaged within the tubular member and which extend outwardly through the mounting member, said attachment means being adapted to releasably engage the strip to a supporting surface.

References Cited in the file of this patent

UNITED STATES PATENTS

| | | |
|---|---|---|
| 2,150,287 | Minor | Mar. 14, 1939 |
| 2,205,538 | Owen | June 25, 1940 |
| 2,215,515 | Matheny | Sept. 24, 1940 |
| 2,319,042 | De Wyk | May 11, 1943 |
| 2,357,513 | Harmon | Sept. 5, 1944 |
| 2,705,211 | De Wyk | Mar. 29, 1955 |
| 2,716,787 | Harris | Sept. 6, 1955 |
| 2,835,924 | Schmeling | May 27, 1958 |
| 2,841,205 | Bird | July 1, 1958 |
| 2,891,288 | Daley | June 23, 1959 |

FOREIGN PATENTS

| | | |
|---|---|---|
| 102,938 | Australia | Jan. 10, 1938 |